United States Patent
Monk

(10) Patent No.: US 8,165,938 B2
(45) Date of Patent: Apr. 24, 2012

(54) PREPAID CARD FRAUD AND RISK MANAGEMENT

(75) Inventor: Justin T. Monk, Parker, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 417 days.

(21) Appl. No.: 11/757,893

(22) Filed: Jun. 4, 2007

(65) Prior Publication Data

US 2008/0301019 A1 Dec. 4, 2008

(51) Int. Cl.
G06Q 40/00 (2006.01)

(52) U.S. Cl. .......................... 705/35; 705/39; 705/44

(58) Field of Classification Search ............... 705/35, 705/39, 44

See application file for complete search history.

(56) References Cited

U.S. PATENT DOCUMENTS

| | | | |
|---|---|---|---|
| 4,485,300 A | 11/1984 | Peirce | |
| 5,465,206 A | 11/1995 | Hilt et al. | |
| 5,477,038 A | 12/1995 | Levine et al. | |
| 5,500,513 A | 3/1996 | Langhans et al. | |
| 5,621,201 A | 4/1997 | Langhans et al. | |
| 5,815,665 A | 9/1998 | Teper et al. | |
| 5,819,226 A | 10/1998 | Gopinathan et al. | |
| 5,845,070 A | 12/1998 | Ikudome | |
| 6,212,266 B1 | 4/2001 | Busuioc | |
| 6,247,129 B1 | 6/2001 | Keathley et al. | |
| 6,270,011 B1 | 8/2001 | Gottfried | |
| 6,282,522 B1 | 8/2001 | Davis et al. | |
| 6,330,546 B1 | 12/2001 | Gopinathan et al. | |
| 6,560,581 B1 | 5/2003 | Fox et al. | |
| 6,837,425 B2 | 1/2005 | Gauthier et al. | |
| 6,915,279 B2 | 7/2005 | Hogan et al. | |
| 6,920,611 B1 | 7/2005 | Spaeth et al. | |
| 6,957,334 B1 | 10/2005 | Goldstein et al. | |
| 7,007,840 B2 | 3/2006 | Davis | |
| 7,039,611 B2 | 5/2006 | Devine | |
| 7,051,923 B2 | 5/2006 | Nguyen et al. | |
| 7,104,446 B2 | 9/2006 | Bortolin et al. | |
| 7,111,789 B2 | 9/2006 | Rajasekaran et al. | |
| 7,121,456 B2 | 10/2006 | Spaeth et al. | |
| 7,124,937 B2 | 10/2006 | Myers et al. | |

(Continued)

FOREIGN PATENT DOCUMENTS

EP 0669032 B1 11/1997

(Continued)

OTHER PUBLICATIONS

U.S. Appl. No. 11/757,623, Monk.

(Continued)

Primary Examiner — Ella Colbert
Assistant Examiner — John Anderson
(74) Attorney, Agent, or Firm — Kilpatrick, Townsend & Stockton LLP

(57) ABSTRACT

A method of monitoring fraud associated with prepaid devices includes configuring fraud platform parameters which comprise one or more limits defined by one or more values, each limit associated with a particular platform parameter, one or more thresholds defined by one or more values, each threshold associated with a particular platform parameter, and one or more rules that define restrictions for certain prepaid device activities. The method further includes applying the fraud platform parameters to prepaid device production data and determining whether to issue the prepaid device depending on whether any parameters were triggered by the production data.

28 Claims, 11 Drawing Sheets

U.S. PATENT DOCUMENTS

| | | | |
|---|---|---|---|
| 7,136,841 B2 | 11/2006 | Cook | |
| 7,152,780 B2 | 12/2006 | Gauthier et al. | |
| 7,231,657 B2 | 6/2007 | Honarvar et al. | |
| 7,243,853 B1 | 7/2007 | Levy et al. | |
| 7,251,624 B1 | 7/2007 | Lee et al. | |
| 7,263,506 B2 | 8/2007 | Lee et al. | |
| 7,280,981 B2 | 10/2007 | Huang et al. | |
| 7,353,214 B2 | 4/2008 | Yamanishi et al. | |
| 7,527,195 B2 | 5/2009 | Keithley et al. | |
| 7,657,497 B2 | 2/2010 | Nandy | |
| 2002/0111919 A1 | 8/2002 | Weller et al. | |
| 2002/0194138 A1 | 12/2002 | Dominguez et al. | |
| 2003/0026404 A1* | 2/2003 | Joyce et al. | 379/144.01 |
| 2003/0101357 A1* | 5/2003 | Ronen et al. | 713/201 |
| 2003/0120593 A1 | 6/2003 | Bansal et al. | |
| 2003/0172040 A1 | 9/2003 | Kemper et al. | |
| 2003/0187783 A1* | 10/2003 | Arthus et al. | 705/39 |
| 2003/0200184 A1 | 10/2003 | Dominguez et al. | |
| 2003/0212642 A1 | 11/2003 | Weller et al. | |
| 2003/0220860 A1 | 11/2003 | Heytens et al. | |
| 2003/0233292 A1 | 12/2003 | Richey et al. | |
| 2004/0019522 A1 | 1/2004 | Bortolin et al. | |
| 2004/0044621 A1 | 3/2004 | Huang et al. | |
| 2004/0050922 A1 | 3/2004 | Gauthier et al. | |
| 2004/0054581 A1 | 3/2004 | Redford et al. | |
| 2004/0054590 A1 | 3/2004 | Redford et al. | |
| 2004/0054591 A1 | 3/2004 | Spaeth et al. | |
| 2004/0059688 A1 | 3/2004 | Dominguez et al. | |
| 2004/0139021 A1 | 7/2004 | Reed et al. | |
| 2004/0148224 A1 | 7/2004 | Gauthier et al. | |
| 2004/0153715 A1 | 8/2004 | Spaeth et al. | |
| 2004/0220964 A1 | 11/2004 | Shiftan et al. | |
| 2005/0021456 A1 | 1/2005 | Steele et al. | |
| 2005/0029344 A1 | 2/2005 | Davis | |
| 2005/0036611 A1 | 2/2005 | Seaton, Jr. et al. | |
| 2005/0045718 A1 | 3/2005 | Bortolin et al. | |
| 2005/0058427 A1 | 3/2005 | Nguyen et al. | |
| 2005/0071225 A1 | 3/2005 | Bortolin et al. | |
| 2005/0071226 A1 | 3/2005 | Nguyen et al. | |
| 2005/0071227 A1 | 3/2005 | Hammad et al. | |
| 2005/0071228 A1 | 3/2005 | Bortolin et al. | |
| 2005/0071235 A1 | 3/2005 | Nguyen et al. | |
| 2005/0097051 A1 | 5/2005 | Madill et al. | |
| 2005/0102234 A1 | 5/2005 | Devine | |
| 2005/0121506 A1 | 6/2005 | Gauthier et al. | |
| 2005/0149455 A1 | 7/2005 | Bruesewitz et al. | |
| 2005/0246278 A1 | 11/2005 | Gerber et al. | |
| 2005/0283416 A1 | 12/2005 | Reid et al. | |
| 2005/0283430 A1 | 12/2005 | Reid et al. | |
| 2005/0283431 A1 | 12/2005 | Reid et al. | |
| 2005/0283432 A1 | 12/2005 | Reid et al. | |
| 2005/0283433 A1 | 12/2005 | Reid et al. | |
| 2006/0006224 A1 | 1/2006 | Modi | |
| 2006/0080243 A1 | 4/2006 | Kemper et al. | |
| 2006/0155644 A1 | 7/2006 | Reid et al. | |
| 2006/0163345 A1 | 7/2006 | Myers et al. | |
| 2006/0178957 A1 | 8/2006 | LeClaire | |
| 2006/0179007 A1 | 8/2006 | Davis | |
| 2006/0290501 A1 | 12/2006 | Hammad et al. | |
| 2006/0293027 A1 | 12/2006 | Hammad et al. | |
| 2007/0001000 A1 | 1/2007 | Nguyen et al. | |
| 2007/0001001 A1 | 1/2007 | Myers et al. | |
| 2007/0005613 A1 | 1/2007 | Singh et al. | |
| 2007/0005774 A1 | 1/2007 | Singh et al. | |
| 2007/0012764 A1 | 1/2007 | Bortolin et al. | |
| 2007/0017970 A1 | 1/2007 | Gauthier et al. | |
| 2007/0034679 A1 | 2/2007 | Gauthier et al. | |
| 2007/0055597 A1 | 3/2007 | Patel et al. | |
| 2007/0055630 A1 | 3/2007 | Gauthier et al. | |
| 2007/0057034 A1 | 3/2007 | Gauthier et al. | |
| 2007/0057051 A1 | 3/2007 | Bortolin et al. | |
| 2007/0083465 A1 | 4/2007 | Ciurea et al. | |
| 2007/0100691 A1 | 5/2007 | Patterson | |
| 2007/0119919 A1* | 5/2007 | Hogg et al. | 235/380 |
| 2007/0125842 A1 | 6/2007 | Antoo et al. | |
| 2007/0288641 A1 | 12/2007 | Lee et al. | |
| 2008/0046334 A1 | 2/2008 | Lee et al. | |
| 2008/0077515 A1 | 3/2008 | Zoldi et al. | |
| 2008/0109356 A1* | 5/2008 | Sutton et al. | 705/44 |
| 2008/0109392 A1 | 5/2008 | Nandy | |
| 2008/0270171 A1* | 10/2008 | Price et al. | 705/1 |
| 2008/0270303 A1* | 10/2008 | Zhou et al. | 705/44 |
| 2008/0275829 A1 | 11/2008 | Stull et al. | |
| 2008/0288299 A1* | 11/2008 | Schultz | 705/4 |

FOREIGN PATENT DOCUMENTS

| | | | |
|---|---|---|---|
| WO | WO 03/069821 A1 | 8/2003 | |
| WO | WO 2006/110392 A2 | 10/2006 | |

OTHER PUBLICATIONS

U.S. Appl. No. 11/757,837, Monk.
U.S. Appl. No. 11/757,980, Monk.
U.S. Appl. No. 11/757,983, Monk.
U.S. Appl. No. 11/757,914, Monk.
U.S. Appl. No. 11/757,985, Monk.
International Preliminary Report on Patentability dated Dec. 17, 2009 from International Application No. PCT/US2008/065552, 6 pages.

* cited by examiner

Program Documents :: Home :: Help :: Sign out

| > Search For ... | > Card Sales | > Work Queues | > Manage Program | > Reports | > Risk Management |

Parameter Set Details
Home > Limits & Thresholds > Parameter Set Details

<Room for system messages>

- Overview
- Fraud Parameter Sets
- Details
- Audit Log
- Tasks
- Add New Parameter Set
- Compare Parameters

Parameter Set

| Setname: | Test Settings 021505 | Status: | Test |
| Date Last Modified: | 02-11-2005 | Modified By: | ppc.kkelley |

Standard Limits and Thresholds

You can specify a single set of values for the following Limits and Thresholds. To deactivate a Limit or Threshold, set its values to blank. Note: Threshold values must be less than or equal to the corresponding limit value.

| Trigger | Type | Decline Code | Limit Override by PAS User | Production Value | Production Period | New Settings Value | New Settings Period |
|---|---|---|---|---|---|---|---|
| # Accounts Purchased with same Buyer Address | Limit | 122 | ☐ Yes | 7 cards | in 4 days | 7 cards | in 3 days |
|  | Threshold | N/A |  | 4 cards |  | 3 cards |  |
| # Accounts purchased with same Cardholder Address | Limit | 122 | ☐ Yes | 3 cards | in 4 days | 3 cards | in 3 days |
|  | Threshold | N/A |  | 2 cards |  | 3 cards |  |
| # Accounts Purchased with same Cardholder Phone | Limit | 122 | ☐ Yes | 7 cards | in 4 days | 7 cards | in 3 days |
|  | Threshold | N/A |  | 4 cards |  | 3 cards |  |
| Maximum # Cards in single purchase | Limit | 122 | ☐ Yes | 14 cards |  | 3 cards |  |
|  | Threshold | N/A |  | 12 cards |  | 2 cards |  |
| Maximum $ Value of a Single Purchase | Limit | 122 | ☐ Yes | $5,000 |  | $5000 |  |
|  | Threshold | N/A |  | $3,000 |  | $3000 |  |
| Funding Account Usage | Limit | 122 | ☐ Yes | 14 cards | in 4 days | 3 cards | in 3 days |
|  | Threshold | N/A |  | 12 cards |  | 2 cards |  |
| Funding Account Total Purchase $ Amount | Limit | 122 | ☐ Yes | $5,000 | in 4 days | $5000 | in 3 days |
|  | Threshold | N/A |  | $3,000 |  | $3000 |  |
| Minimum Dollar Load Per Transaction | Limit | 122 | ☐ Yes | $20 |  | $35 |  |
|  | Threshold | N/A |  | $25 |  | $45 |  |
| Maximum Dollar Load Per Transaction | Limit | 122 | ☐ Yes | $10,000 |  | $5000 |  |
|  | Threshold | N/A |  | $5,000 |  | $4500 |  |
| Maximum Dollar Loads Per Day | Limit | 122 | ☐ Yes | $3,000 |  | $5000 |  |
|  | Threshold | N/A |  | $2,000 |  | $4500 |  |
| Maximum Account Balance | Limit | 122 | ☐ Yes | $3,000 |  | $5000 |  |
|  | Threshold | N/A |  | $2,000 |  | $4500 |  |
| Maximum Yearly $ contribution to a Health Savings Account | Limit | 122 | ☐ Yes | $10,000 |  | $5000 |  |
|  | Threshold | N/A |  | $5,000 |  | $4500 |  |
| Maximum Load Count | Limit | 122 | ☐ Yes | 5 times | in 2 days | 3 times | in 3 days |
|  | Threshold | N/A |  | 4 times |  | 2 times |  |
| Cash Withdrawal Single Transaction | Limit | 122 | ☐ Yes | $500 |  | $500 |  |
|  | Threshold | N/A |  | $400 |  | $450 |  |
| Purchase Limit - Single Transaction | Limit | 122 | ☐ Yes | $500 |  | $500 |  |
|  | Threshold | N/A |  | $400 |  | $450 |  |
| Funding Account Additions or Changes | Limit | N/A | N/A | 5 times | in 6 days | 3 times | in 3 days |
|  | Threshold | N/A |  | 4 times |  | 2 times |  |
| Cardholder Primary Address Changes | Limit | N/A | N/A | 5 times | in 6 days | 3 times | in 3 days |
|  | Threshold | N/A |  | 4 times |  | 2 times |  |

FIG. 4

| | | | | PRINT | CLOSE |
|---|---|---|---|---|---|
| Issuer: | Your Financial Institution | Card Program: | Your Financial Institution Reloadable | | |
| Location: | Your Financial Institution | | | | |
| Base Set Name: | Test Settings 1 | Comparison Set: | January Settings | | |
| Start Test Date: | 02-01-05 | Ending Test Date: | 02-15-05 | | |
| Base Cases Created: | 100 | | | | |
| Compare Cases Created: | 110 | | | | |
| Difference: | 10 | | | | |
| Percentage Variance: | 10% | | | | |

Fraud Rules with Multiple Triggers

You can set each trigger relating to this rule as on or off. Detail for all triggers will still appear in the Fraud case for reference purposes.

| Rule | Current Trigger | | New Settings | Difference | |
|---|---|---|---|---|---|
| | Active Trigger | | Active | Hits | % |
| ▼ Address | | | | | |
| Verification | ☑ | A - Address ambiguous | ☑ | -1,000 | N/A |
| | ☑ | B - Match to business name - residential address | ☑ | 50 | 3% |
| | ☑ | B0 - Business name match - no confirmation | ☑ | -25 | -100% |
| | ☑ | B1 - Business name match - single source confirms | ☑ | +100 | N/A |
| | ☑ | B2 - Business name match - two source confirm | ☑ | 50 | 4% |
| | ☑ | BB - Match to business name - business address | ☑ | 200 | 1000% |
| | ☑ | BM - Match to business name - mixed use address | ☑ | 50 | 3% |
| | ☑ | E - Matching records exceed maximum defined in profile | ☑ | 24 | 7% |
| | ☑ | E0 - Error - no confirmation | ☑ | -25 | -5% |
| | ☑ | E1 - Error - single source confirms | ☑ | 0 | 0% |
| | ☑ | E2 - Error - two sources confirm | ☑ | -25 | -100% |
| | ☑ | F0 - Full name match - no confirmation | ☑ | +100 | N/A |
| | ☑ | F1 - Full name match - single source confirms | ☑ | 50 | 4% |
| | ☑ | F2 - Full name match - two sources confirm | ☑ | 200 | 1000% |
| | ☑ | H - House number not found on street | ☑ | 50 | 3% |
| | ☑ | I - Incomplete or blank address | ☑ | 24 | 7% |
| | ☑ | IV - Invalid address | ☑ | -25 | -5% |
| | ☑ | N - No match to name - residential address | ☑ | 0 | 0% |
| | ☑ | N0 - No name match - no confirmation | ☑ | -25 | -100% |
| | ☑ | N1 - No name match - single source confirms | ☑ | +100 | N/A |

| | | | |
|---|---|---|---|
| CASE INFORMATION | | | |
| Card Program: | Your Financial Institution Reloadable Gift | Buyer Name: | Jane Smith |
| Card Number: | 4122 6100 0000 0555 | Recipient Name: | John Doe |
| Card Status: | Fraud Lock | Available Balance: | $319.99 |
| Case Number | 333-123456 | | |
| Card Status: | Open | Assigned to: | ppc.pcteriet |

Rules Triggered

| Rule | Date & Time | Triggering Event |
|---|---|---|
| Address Velocity | 11-01-2004 18:00:21 | Threshold = 5 within 2 day(s) Actual = 6 within 1 day(s) |
| Exists in Neg File | 11-01-2004 23:59:59 | Address, Phone |
| Load Source Velocity | 11-01-2004 23:59:59 | Threshold = 2 within 1 day(s) Actual = 5 within 1 day(s) |
| OFAC | 11-01-2004 21:09:33 | OFAC: Code 3 = match to SSN only |
| Patriot Act | 10-31-2004 19:56:00 | Patriot Act: Address High Risk Code YA = high risk business identified at this address |
| Recipient Phone Velocity | 11-01-2004 22:45:33 | Threshold = 3 Actual = 5 |
| Rush Card, New Address | 11-01-2004 23:00:33 | Yes |

Negative File Information

| Element | Buyer | Negative Files Issuer | Recipient | Negative Files Issuer |
|---|---|---|---|---|
| Address: | 111 Main St. Denver CO 80233 | ✓ | 1111 Main St. Denver, CO 80231 | ✓ |
| Phone: | 303-123-4567 | ☐ | 303-234-5678 | ✓ |
| Load Source: | 0504 3244 5776 0342 | ☐ | 4454 8452 1536 0377 | ☐ |
| Load Source: | | | 4454 8434 3456 3453 | ☐ |

Case History & Notes

| Date & Time | Action | Action By | Details |
|---|---|---|---|
| 11-11-2004 07:45:34 | Case Reassigned | System | Case assigned to ppc.pcteriet, who clicked on the unassigned case |
| 11-10-2004 22:45:34 | Case Unassigned | ppc.kkelly | Reassigned this case to "Unassigned" |

FIG. 7

Add to Negative File

Home > Fraud Queue > Case Detail > Add to Negative File

Tasks
- Work the Fraud Queue
- Case Detail
- Access Negative Files
- Overview
- Reports > Search For... | > Card Sales | > Work Queues | > Manage Program | > Reports | > Risk Management Program Documents :: Home :: Help :: Sign out <Room for system messages>

Add Elements to Negative File

| Element Type | | Add this Element | Negative File Issuer |
|---|---|---|---|

Phone: 303-123-4567

Funding Account: 4454-8452-1536-0377

Notes: Explain why the element(s) that you're adding are associated with fraud. If customers use these elements in the future, the elements will trigger a Fraud Rule and open a Fraud Case.

CANCEL  SUBMIT

FIG. 8

| > Search For... | > Card Sales | > Work Queues | > Manage Program | > Reports | > Risk Management |

:: Negative File
Home > Negative File

- Tasks
  - Work the Fraud Queue
  - Access Negative Files
  - Element Detail
- Overview
- Reports <Room for system messages>

Negative File Element Information

| Element: | 4615 Way Boulder, CO 80305 | Type: | Address |
|---|---|---|---|
| Status: | Active | Date Added: | 08-27-2004 10:22:45 |
| Total Hits: | 2 | Date Last Hit: | 10-31-2004 07:22:45 |
| Issuer: | Your Financial Institution | Added by: | ppc.mcooper |

Negative Element History and Notes

Records Found: 7 • Page 1 of 1

| Date & Time | Action | Action By | Details |
|---|---|---|---|
| 11-02-2004 13:51:01 | Active | ppc.hsimpson | put it back in, sorry |
| 11-02-2004 13:44:32 | Inactive | ppc.hsimpson | inactivating it |
| 10-31-2004 07:22:45 | Hit | System | Neg element triggered Fraud Rule: "Exists in Neg File" See case 333-889007 |
| 09-22-2004 09:35:35 | Hit | System | Neg element triggered Fraud Rule: "Exists in Neg File" See case 333-883242 |
| 09-11-2004 07:45:34 | Note | ppc.srodner | Just noticed this in the Neg file - thanks Marian, I was thinking about adding it too. |
| 08-27-2004 10:22:45 | Active | System | Element Status changed from n/a to Active |
| 08-27-2004 10:22:45 | Negative Element Added | ppc.mcooper | Added to Issuer's Negative file |

Angua W. at Your Financial Institution confirmed that this address has been used in fraud and should be added to the Neg file.

Next

Add Notes

| CANCEL | MAKE INACTIVE/ACTIVE | SUBMIT NEGATIVE ELEMENT NOTES ONLY |

Program Documents :: Home :: Help :: Sign out

FIG. 9

PREPAID CARD FRAUD AND RISK MANAGEMENT

FIELD OF THE INVENTION

This invention relates, in general, to fraud analysis in prepaid card systems.

BACKGROUND

Due to the nature of prepaid cards, many of the traditional fraud analysis tools are not applicable and will not detect the types of fraud associated with prepaid products. For example, because an Issuer of a credit card is extending credit, the Issuer will typically use a credit score to screen the applicant. However, for prepaid cards, the Issuer acts as a merchant and is selling a product and not extending any type of credit, thus credit scores are not applicable.

Accordingly, as recognized by the present inventor, what is needed is a system and method for using enrollment and transaction parameters to identify potential fraud cases in a prepaid device environment.

It is against this background that various embodiments herein were developed.

SUMMARY

In light of the above and according to one broad aspect of one embodiment of the present invention, disclosed herein is a method for monitoring fraud associated with prepaid devices such as prepaid cards. Generally, fraud platform parameters are configured, the platform comprising one or more limits that define values associated with particular prepaid activities; one or more thresholds that trigger when a program parameter has been reached or exceeded; and one or more rules that define restrictions for certain prepaid device activities. The platform parameters may be applied to the prepaid device production data to determine whether to issue the prepaid device depending on whether any parameters were triggered by the production data.

According to another embodiment, a method for managing fraud associated with prepaid devices is provided. Generally, the method may comprise entering enrollment and funding information associated with a prepaid device into a prepaid device processing system; uploading a platform of fraud parameters, the parameters further comprising limits, thresholds and rules designed to trigger potential prepaid device fraud cases into the processing system; running the enrollment and funding information against the fraud rules; verifying any information that triggered one or more fraud rules; using configured rules to determine whether a fraud case is created; and managing the fraud case in a fraud queue through disposition.

BRIEF DESCRIPTION OF THE DRAWINGS

FIG. 4 illustrates an example of a graphical user interface that may be provided in order to facilitate processing of a fraud parameter platform in accordance with one embodiment of the invention.

FIG. 5 illustrates an example of a graphical user interface that may be provided to configure a plurality of associated triggers in accordance with one embodiment of the invention.

FIG. 6 illustrates an example of a graphical user interface for use in assessing application of the fraud platform parameters to actual production data in accordance to one embodiment of the invention.

FIG. 7 illustrates an example of a graphical user interface for use in viewing the status of a fraud case in accordance to one embodiment of the invention.

FIG. 8 illustrates an example of a graphical user interface for use in configuring a negative file in accordance with one embodiment of the invention.

FIG. 9 illustrates an example of a graphical user interface for use in viewing the status of a negative file element in accordance with one embodiment of the present invention.

DETAILED DESCRIPTION

Figure 1:
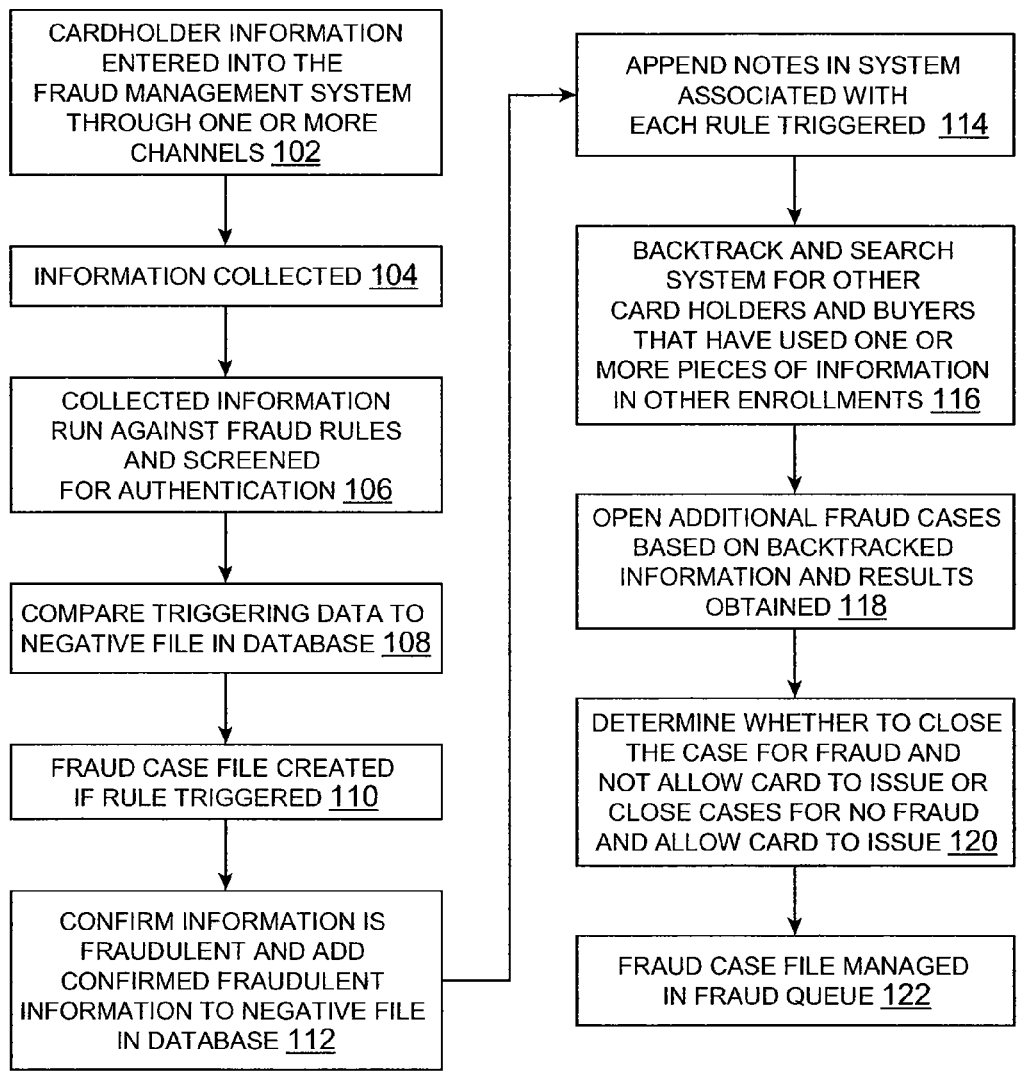
FIG. 1 illustrates a block diagram of an example of logical operations that may be performed in the case that a rule is triggered within a fraud rule set in accordance with one embodiment of the invention.

Methods used to detect fraud in credit card type transactions are not generally effective in a prepaid device environment. Because the prepaid device Issuer is selling a product and not extending credit, credit scores alone are generally not applicable. However, information associated with the credit scores may be used, as described further herein. Similarly, back-end transaction fraud detection strategies often rely on historical data to highlight out-of-character transactions, and the number of transactions associated with a typical prepaid device may not meet the requirements for an accumulated transaction history.

There are generally three types of fraud in the prepaid environment. Roaming fraud, where an individual supplies demographic data including for example, name, address, government ID, that are not their own in an attempt to defraud the Issuer by enrolling under an alias. Load fraud, where an individual with an otherwise legitimate device loads from a stolen or other fraudulent source, e.g., a stolen credit card. Transaction fraud, where an individual uses various methods to fraudulently use a device at merchants, ATMs and other POS transactions.

Embodiments of the present invention provide a solution to monitoring fraud in the prepaid device environment. For example, in one embodiment, a set of fraud parameters is provided comprising defined limits, thresholds and rules designed to isolate suspect device activity. The parameters are run against prepaid device production data to trigger potential fraud cases. Once certain cases are triggered, a fraud management system may be used to determine appropriate courses of action. Various embodiments of the present invention are described herein, and may be implemented as methods, systems, apparatus or in other forms.

The term "device" or "devices" includes but is not limited to cards, fobs, cellular phones, personal digital assistants (PDAs), pagers, smart media, transponders, and the like, and these terms are used interchangeably herein. The term "card" or "cards" includes but is not limited to, for example, bank cards, prepaid, preloaded or prefunded cards, such as general purpose reloadable cards, travel cards, payroll cards, teen or student cards, commercial cards, gift cards, or any other type of preloaded, prefunded or prepaid conventional payment cards that a customer can use in lieu of a cash payment, and these terms are used interchangeably herein. The term "transaction" includes but is not limited to bill pay, point-of-service purchase, ATM withdrawal, balance inquiry, or any other purchase type activity through prepaid device usage. The term "device holder" includes but is not limited to, for example, a device holder of any type of device (as that term is used herein), a customer or account holder, and these terms are used interchangeably herein. The term "Issuer" includes but is not limited to a bank or other financial institution that issues the prepaid devices. The term "prepaid card processing network" or "processing network" includes but is not limited to an electronic payment system, or any conventional network or system for authorizing or processing electronic payments and/or settling such payments between entities in a prepaid device system. The term "processor" means a business entity, acting as an agent of a financial institution that provides authorization and settlement of services. In various embodiments, Processors may connect to the processing network and may manage activities for a member.

In accordance with one embodiment, FIG. 1 illustrates an example of logical operations for providing fraud management in a prepaid device environment. In a first operation, device holder information is entered into the fraud management system through one or more appropriate channels (step 102).

Figure 2:
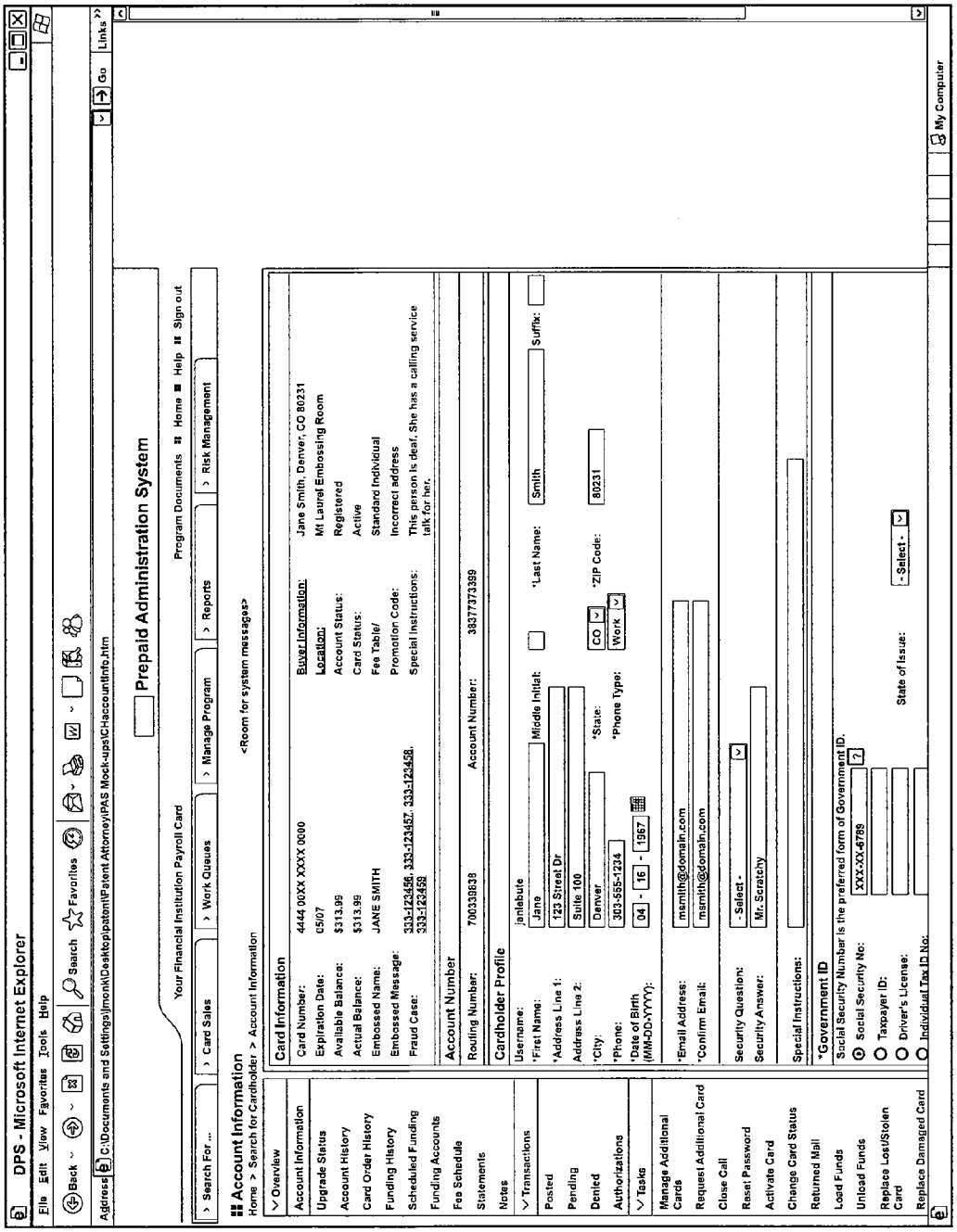
FIG. 2 illustrates an example of graphical user interface that may be provided for inputting prepaid device enrollment information in accordance with one embodiment of the invention.

In one example, a consumer web site may comprise a graphical user interface to provide a series of fields that may be used by the consumer to enter device holder information. The web site may further be configured to accommodate the look, feel and branding of an Issuer. An example of a GUI for device holder information is illustrated in FIG. 2 for a Commerce gift card. As shown in this example, the Issuer requires name, address, phone, date of birth, government identification number, personalized question for security purposes and email address.

In another example, device holder information may also be entered into a system through an application such as, prepaid administration termination. For example, employers may do bulk enrollments or individual enrollments for new commercial or payroll card holders. Thus, employers input the required information. Although not specifically enumerated, it will be recognized that additional forms of data entry are contemplated herein.

Referring again to FIG. 1, in a second operation, the device holder information may be collected from the device holder or from another suitable source (step 104). In a third operation, the collected information is run against fraud rules and screened for authentication (step 106) in an attempt to verify the collected information. In general, verification is an attempt to identify information provided by the device holder that may be invalid, or does not exist.

In one embodiment, information requiring verification may be sent to a credit reporting service and cross referenced with the agency database. The address may be cross checked to make sure the inputted address is not high risk by checking that it is not a hospital address; a jail address; or an incomplete apartment address. Verification may also identify addresses that use a business address as a residential address. In a further embodiment, high risk geographical areas may be flagged based on statistically probable mail fraud risk.

In another embodiment, a third party database such as a credit reporting/scoring database may be accessed to verify the device holder demographic information. In some cases, the database may be used to validate and verify one or more pieces of information in combination. For instance, the name, address and birth date may be evaluated to see if these separate pieces of information comport with each other. If the information does not comport, for example, if a piece of information does not match the information provided in the database, each piece of information may be analyzed separately through one or more additional databases including additional third party databases. For example, the phone number is run against one or more databases to determine whether it is high risk, legitimate, a business number, a high risk industry, mismatched area code and number, or simply a random number, etc.

In a further embodiment, a social security number database may be accessed and compared with the device holder data. A rule may be triggered if, for example, the social security number has been reported deceased or if the date of birth does not match the social security number. In a further embodiment, the device may be flagged because the social security number has been flagged as high risk in the database.

In another embodiment, Office of Foreign Asset Control (OFAC) compliance may be provided and configurable by the processor or Issuer. For example, one or more pieces of information such as social security number, name, date of birth, and year of birth may be provided to a third party database for screening. In one embodiment, the information is provided through an XML interface. The third party may then run the data provided against their database and send a reply. The processor or Issuer receives the reply and based on the reply and rule configuration, determines if the attempt passes OFAC screening. In a further embodiment, the system may be configured so that each element submitted for verification will return a verification case, so that if there is a match the account is placed on hold according to the fraud rule triggered.

In a further embodiment, the system may provide for an optional periodic screening, where the period may be measured in days, weeks, months, etc., for all accounts on the prepaid platform. Such screening may be effective in continued monitoring due to continual updates to the database and the potential for device holders who have a device that may become a new entry within the OFAC database.

In one embodiment, the updated database may be provided to the Issuer or processor on a periodic basis. The updated database may be run against the device holder information on the prepaid platform and positive matches reported. The search results may be used to create new fraud cases with the information forwarded to the fraud queue for resolution. Depending on the rules, action may or may not be taken on the account prior to resolution.

In still a further embodiment, the system may provide Patriot Act compliance. The Patriot Act is the title of the Federal regulation requiring banks to verify the identity of any person seeking to open an account to the extent that it is reasonable and practicable. In some cases, the Issuer may require Patriot Act compliance. The processor may verify the information via a third party for both the device holder and the buyer by providing information to be run against the third party database. For example, name, residence street address, date of birth, social security number, drivers license and state of issuance, and other subject identifying information. Once the device holder information is collected, the data can be standardized and verified in-house or with a $3^{rd}$ party database for example, via an XML interface. In another example, the data is submitted to a third party database for validation. Once validated, the third party database sends the reply to the Issuer or processor who can, based on the reply, determine if the enrollment attempt has passed the Patriot Act based on the configured rule. In some cases, the information associated with the Patriot Act checks can be stored as required under the Patriot Act. In one cases, a field may be added to the database for Patriot Act verification. Further, accounts may be rescreened as any device holder data is amended. If on rescreening there is a match to the database, the data may be considered high risk and a fraud case may be created.

Triggering data refers to collected information that may trigger a fraud case file to be created. In some cases, collected information that is determined to be high risk is triggering data. In another example, where completely random data has been fully or partially entered into the system, the collected information is triggering data. In yet another example, collected information that does not pass the fraud rules is considered triggering data. Triggering data may be compared to one or more files with known fraud cases (e.g. negative files) in a third party database or an internal database.

In a fourth operation, the collected data is compared to a negative file stored in a database (step 108). In a fifth operation, if any of the rules within a fraud rule set on any of a plurality of databases are triggered by the collected data, then a fraud case file is created (step 110). In this case, the collected data that triggers a fraud case file to be created is considered to be triggering data.

In a sixth operation, the triggering data is confirmed to be fraudulent and is added to a negative file stored in a database (step 112). To confirm that the triggering data is fraudulent, the data is run against the negative file and the results assessed to determine whether the device holder information is fraudulent based on one or more factors and one or more hits against the database. If the triggering data is fraudulent, the data is added to one or more negative files stored in the database. The added data will trigger additional suspected cases.

In a seventh operation, the system may be appended with notes associated with each rule that is triggered (step 114). In one embodiment, the notes may be used to mark which rules were fraudulent and which rules were not. In this way, notes may be associated with each of the fraud rules supported by the system.

In a eighth operation, the system may backtrack and search for other device holders and buyers that have used one or more pieces of the new negative file information in other enrollments (step 116). For example, a phone number determined to be fraudulent and added to the negative file may be searched in the system to determine whether it is being used for other devices.

In a ninth operation, any hits based on the backtrack search may be used to open additional fraud cases and obtain results (step 118).

In an tenth operation, the fraud analyst determines whether to close the case for fraud and not allow the device to issue, or close the case for no fraud and allow the device to issue (step 120). For example, in a case where the case is closed for fraud, the account is closed and the device number is not issued to the device holder. In another example, the parameters may further be configured to direct the Issuer to place the enrollment on hold, or in some cases to allow the device to issue even if some fraud rules were triggered. In one embodiment, the Issuer may configure on a rule-by-rule basis whether or not a fraud case file is created based on the results that come back from the device holder data verification.

In some embodiments, the processor may compile a report or series of reports that are delivered to the Issuer listing the number of fraud cases opened and the disposition of each case.

In an eleventh operation, the fraud case file may be promoted to the fraud queue and managed by the processor or Issuer (step 122). In one embodiment, the information is added to the negative files stored on the database through the fraud queue. In this way, the negative files are continually updated and if the information is used again, a fraud rule will trigger and another case may be opened because it indicates fraudulent information.

Figure 3:
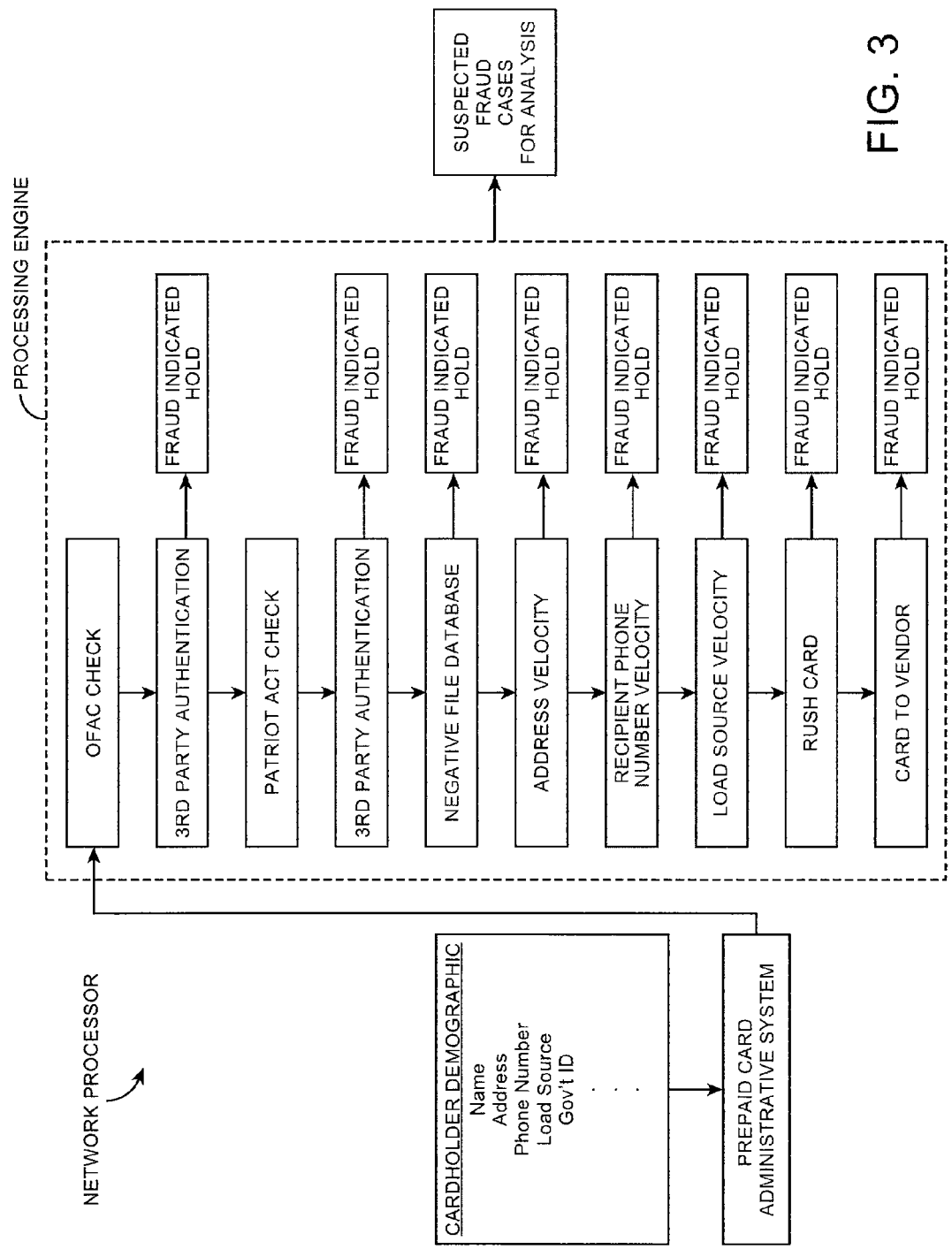
FIG. 3 illustrates a block diagram of an example of a system for processing production data against a fraud platform in accordance with one embodiment of the present invention.+

In accordance with one embodiment, FIG. 3 illustrates an example of a block diagram for processing a set of prepaid device production data against a set of fraud parameters. In FIG. 3, the system may include a network processor comprising an administration system and a processing engine. In a further embodiment, a fraud processing engine may be integrated with or in communications with one or more databases that may be used to verify information associated with a prepaid device.

As illustrated in FIG. 3, in one embodiment, a device holder provides certain demographic information to a prepaid device administration system. Such information may include, for example, device holder name, address, phone number, load source, government ID, etc. The demographic information is uploaded to a processing engine. In another embodiment, an Issuer communicates with a network processor to configure fraud platform parameters. The configured platforms may be named or assigned a designation and uploaded to the processing engine. The processing engine runs production data received from the network processor on the fraud parameter platform and assesses the fraud cases triggered. During processing, the fraud processing engine may further run the production data against a negative file database or another third party database such as, OFAC or Patriot Act.

In operation, in the prepaid device system, the Processor may be responsible for developing and maintaining a fraud and risk management system that is designed for the unique features associated with a prepaid product. In a further embodiment, the Processor may assist the Issuer in managing fraud by providing configurable products and services based on the device program and device type. In various embodiments, a fraud management system may combine industry standard fraud tools, with products and services specifically designed for prepaid products. The system comprises tools to reduce fraud by monitoring and identifying for example, suspect device buyers and recipients, fraudulent enrollment attempts, suspect funding transactions, and suspect transactions.

In one embodiment, a prepaid fraud and risk management system functionality is configured during implementation of a device account or device program. Configurable parameters provide the system with a set of rules that are used to signal the possibility of fraudulent transactions. Because a single violation of one of these parameters does not necessarily signal a fraudulent account, the system provides a wide array of fraud monitoring parameters that collectively create a cohesive, multi-layered fraud management system. These parameters may comprise separate categories such as, limits, thresholds and rules.

According to one embodiment, system access may be accommodated through an administration system. For example, the administration system may comprise a browser based application for managing a prepaid device programs' back-office and account maintenance functions, for example, account enrollment and issuance, account maintenance, device holder customer service, funds management, fraud management and device inventory management.

In various embodiments, fraud rules may be used for example, when the buyer/recipient address is initially entered during the device purchase process via the consumer website; when the Buyer/recipient address is modified by the buyer/deviceholder via the consumer website; when the buyer/recipient address is initially entered during the registration process via a type of administration system; when the buyer/recipient address is modified via a type of administration system; when the primary buyer address (not billing address) is initially entered during the buyer profile set-up/process in the consumer website; when the primary buyer address located in the buyer profile is modified by the buyer via the consumer website; when the Buyer address located in the buyer profile is modified via an administration system; when the buyer billing address is entered during the device purchase process; when the buyer billing address is entered or modified by the buyer in the buyer profile (update billing information) function; or individual device orders entered via an administration system.

In one embodiment, the tools may be parameter driven and configured based on the risk tolerance level of the institution. In one example, some fraud mitigation tools may include for example, front end enrollment screening, OFAC and Patriot Act checking, transaction monitoring, fraud and flash fraud rules, limits and thresholds, and fraud queue monitoring and analysis.

In one embodiment, set-up of the fraud platform parameters provides the foundation for the program upon which downstream products and services will be based. The parameters are configurable and may comprise one or more separate categories to provide a wide array of fraud monitoring parameters including for example, limits, thresholds and rules. Although a single violation of a parameter or threshold may indicate a fraudulent account, in various embodiments it is a combination of factors that may signify a likely fraudulent account.

In one embodiment, a prepaid fraud and risk management system may comprise a set of configurable parameters that are key indicators of potentially fraudulent enrollment attempts. The parameter platform may comprise a series of default rules configured by a Processor or other third party. The platform may be provided to the Issuer. The Issuer may then further define the limits and thresholds associated with a particular rule. A scoring model may further be provided to an Issuer with a method to detect, identify and take action on potentially fraudulent transactions. For example, based on a number of events, a score may be produced and in combination with an Issuer defined threshold, an account may be identified as potentially fraudulent. The Issuer may then be alerted to the potentially fraudulent account.

In one embodiment, platform parameters may be defined, for example, certain rules selected and limits and thresholds defined by the Issuer and set by the Processor during device program implementation. Platform parameters may be run against production data such as device holder enrollment data, funding account data, issuance data (e.g., proper address) and usage or transaction data to determine how the rule will trigger suspected fraud cases.

In another embodiment, thresholds may be associated with each parameter. In many instances, an individual will conduct a fraudulent transaction just below the platform parameter in an attempt to mask their transactions. Fraud threshold settings are available for one or more limits and are intended to allow Issuers the ability to identify transactions that occurred just below the limit established by the parameter. In one example, the fraud threshold and the corresponding limit are associated with each other and may then have the same reset period and the same applied to dates. In operation, when one of the program parameters with an established limit or threshold has been reached or exceeded, a rule is triggered to alert the Issuer.

In one example, the platform limits or thresholds may be based on a rolling period of time defined as a number of days. Based on the type of limit or threshold, the Issuer can set up numerous limits or thresholds to allow for differentiation between daily, weekly and monthly limits defined as days. In a further example, each limit or threshold may have the same effective date. In this way, an Issuer may change limits that will change how their program performs in production.

FIG. 4, described below, illustrates an example of a graphical user interface that may be provided in order to facilitate processing of the fraud parameter platform on the prepaid system. As illustrated in FIG. 4, in one embodiment, a scalable and configurable prepaid fraud platform may be provided. The prepaid fraud platform may comprise a set of flexible, parameter driven features and functions tailored to particular business types and various prepaid device types. The parameter set may comprise a series of triggers further defined by associated limits and thresholds that may be set by the Issuer and/or the Processor. In a further embodiment, the triggers are configurable by activation or deactivation. In another embodiment, as shown in FIG. 4, multiple sets of values may be specified for at least some limits and thresholds.

Referring to FIG. 4, in one example, one trigger is defined by the number of accounts purchased with the same buyer address. In operation, according to FIG. 4, when 7 or more devices are purchased with the same buyer address or when the threshold of 4 devices purchased for the same buyer address is reached, a rule is triggered to alert the Issuer of a suspected case of fraud. The intent of the threshold is to find transactions that are below the parameter limit but are still suspect. Although further triggers and associated limits and thresholds are shown in FIG. 4, it will be recognized by one of skill in the art that this example is not meant to be encompassing of all possible fraud triggers.

Limits may be placed on enrollment of the prepaid devices in some embodiments. In some cases, enrollment limits may be established at the Issuer device program type level and may further be overridden at a sub-client level by, for example, an employer. In one embodiment, a buyer address may have an account limit applied to it through one of the parameters. The Issuer may place a limit on the number of device accounts which may be purchased within a specified number of days with the same buyer address. If the account exceeds the limit the buyer is notified and the purchase is declined.

In some embodiments, enrollment limits may be overridden by allowing an issuer to configure platform settings at the employer level (sub-client). In the prepaid market, employers demand customization of their program to differentiate between like programs in the same market. Employer customizations may include, for example, customized fee schedules, promotion codes, card designs, fraud rules, limits for high risk clients, card class options (Plus, Interlink, Instant Issue, Upgrade etc.) This allows the Issuer to customize the program to meet the specific needs of clients without the overhead of a creating a completely new program. This also allows the Issuer to take advantage of economies of scale and efficiencies with reporting, settlement and cost. In addition, Issuers can customize payroll options for employers based on contractual needs. In addition, this allows for a more efficient and manageable single card program rather than multiple card programs due to differences between employer.

In a further embodiment limits may be placed on the recipient address account. For example, an Issuer may place a limit of the number of device accounts which may be purchased within a specified number of days with the same recipient address regardless of buyer or funding source. If the account exceeds the limit the purchaser may be notified and the purchase may be declined. In a further embodiment, a limit may be placed on the recipient phone number. For example, the Issuer may limit the number of accounts which may be purchased within a specified number of days with the same recipient telephone number regardless of buyer or funding source. If the account exceeds the limit the purchaser may be notified and the purchase may be declined.

In another embodiment the Issuer may define the initial purchase and value load platform parameters and limits. In one example, funding and/or re-load limits and initial purchase limits may be separated into two distinct sets of limits and thresholds. For example, a limit may be placed on the number of devices that can be purchased in a single order session. In addition, a limit may be placed on the maximum value for a single purchase request, i.e. the total dollar amount that can be purchased within a single purchase order or session.

In a further example, the Issuer may place a limit on the number of prepaid devices in a single funding account that may be purchased within a specified number of days. If the account exceeds this limit the purchase may be declined. In another example, an Issuer may place a limit on the funding account total purchase amount. In this example, a limit may be placed on the total cumulative dollar amount of pre-paid cards in a single funding account that may be purchased within a specified number of days. If the cumulative total amount exceeds this limit, the purchaser may be notified and the transaction may be declined.

In a further example, the Issuer may place a minimum dollar balance per card per purchase limit. If the initial purchase amount is below the minimum the buyer may be notified and the transaction may be declined. In another example, the Issuer may place a limit on the maximum dollar balance per card per purchase in this example. If the initial purchase amount is above the maximum, the buyer is notified and the transaction may be declined. In one embodiment, the limit cannot exceed the maximum balance allowed on a per card balance.

In a further embodiment the Issuer may place re-load limits on the prepaid cards. For example, the Issuer may place a minimum re-load amount per transaction on the device. In this embodiment, if the re-load amount is below the minimum the deviceholder/account holder is notified and the transaction may be declined. In another example, the Issuer may place a limit on the maximum re-load amount per transaction. If the re-load amount is above the maximum the deviceholder/account holder is notified and the transaction may be declined. In another example, the Issuer may place a limit on the maximum re-load amount per day. In this example, if the total dollar amount of all loads attempted during one calendar day is above the maximum the deviceholder/account holder is notified and the transaction may be declined.

In another example, the Issuer may place a limit on the maximum re-load amount per multiple day period on the pre-paid device. In this example, if the total dollar amount of all loads attempted during a period defined as multiple days is above the maximum the deviceholder/account holder is notified and the transaction may be declined. In another example, the Issuer may place a limit on the maximum account balance allowed at anytime. If the total dollar amount of any load or purchase exceeds the maximum the transaction is declined.

In a further example, an Issuer may place a limit on the maximum contribution. The contribution limit may be calculated based on a calendar basis. For example, the maximum account balance may be based on yearly basis and the contribution reset at the beginning of each year. Funds can roll over from the previous year and it does not impact the maximum contribution limit. The amount can be reset on a calendar basis.

In a further example, an Issuer may place a limit on the maximum re-load count. In this example, the total number of re-loads allowed per day, week and/or month is defined as days. If the deviceholder has exceeded the number of loads permitted in the defined time period the account holder is notified and the transaction may be declined.

In a further embodiment, the fraud parameters may further comprise transaction processing parameters. Transaction processing parameters may include for example, cash withdrawal, transaction limits, cash withdrawal time limits, purchase limits, purchase time limits, aggregate dollar velocity limits such as the total aggregate dollar velocity of cash and goods/purchase transactions that includes funds spent at a merchant or ATM including over the counter (OTC), Cashback, signature and PIN transactions, lost stolen limits and limit overrides. As used herein, cash withdrawal may refer to for example, ATM withdrawals, manual teller cash withdrawals or cash back at the point of service. Limit overrides allow the Issuer to determine which limits may be overridden by administration system override functionality.

Some examples of enrollment threshold settings include but are not limited to buyer address account threshold, that is the number of accounts that may be purchased within a specified number days with the same purchaser address; recipient address account threshold, that is the number of accounts that may be purchased within a specified number of days within the same recipient address; and recipient telephone number account threshold, that is number of accounts that may be purchased within a specified number of days within the same recipient telephone numbers. In another example, initial purchase threshold settings may include but is not limited to maximum devices for a single purchase threshold; maximum value for a single purchase request; funding account purchase account threshold; funding account total purchase amount threshold; and maximum dollar balance per device purchase threshold. Re-load threshold settings may include for example, re-load amount per transaction threshold dollar loads per day threshold, dollar loads per day threshold, dollar loads per multiple day period, account balance threshold, load count threshold, funding account decline threshold. Transaction threshold settings may include for example, cash withdrawal transaction threshold, cash withdrawal time threshold, purchase threshold, purchase time threshold, aggregate dollar velocity limit, that is the total aggregate dollar velocity of cash and goods or purchase transactions that includes funds spent at a merchant or ATM which includes ATM OTC, cash back signature and pin transactions. The total transactions may further be defined, for example defined in days and lost or stolen device threshold.

Figure 6:
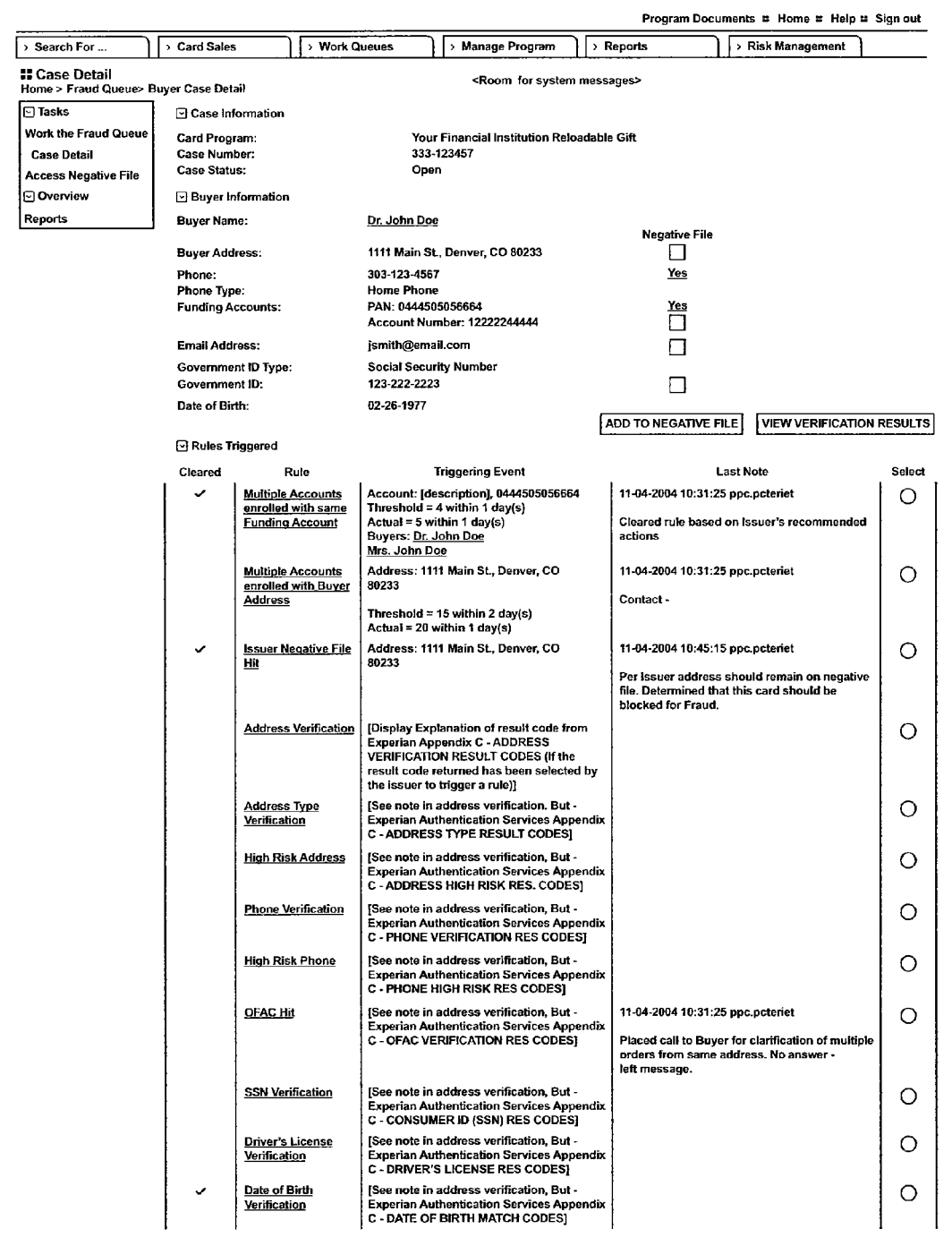

In addition to the platform parameters, in one embodiment as shown in FIG. 6, the platform further supports a number of defined fraud rules that function to highlight potentially fraudulent enrollment attempts and active accounts. Each rule may further comprise one or more triggers. Each rule is configurable by activating or deactivating one or more triggers within the rule.

Referring to FIG. 6, the rule shown is address verification. Within the rule, are a number of triggers. For example, address ambiguous, match to business name —residential address, business name match—no confirmation, etc. Each of these triggers further comprise a field to activate or deactivate the trigger and thus further configure the rule.

FIG. 6, shows an example of a graphical user interface for use by the Issuer or Processor in assessing application of the fraud platform parameters to actual production data. It is understood that these examples are provided as examples only and that various embodiments of the present invention may or may not include one or more features shown therein. Sample display screen may include a number of fields showing case information including buyer demographic information, for instance, buyer address, phone, phone type, funding account or accounts, email address, government ID type and number, and date of birth. The user interface may further include fields that enable adding the case information to a negative file or to viewing of verification results. The display screen may further include a section for viewing the rules, triggering events for the rule and notes related to the fraud case file. For example, in FIG. 6, the rule "multiple accounts enrolled with the same funding account" was triggered by exceeding the threshold of 4 devices within 1 day by the actual value of 5 devices within 1 day. Under the notes, the rule was cleared based on the Issuer's recommended actions.

FIG. 7 illustrates another example of a graphical user interface for use by the Issuer or Processor in viewing the results or status of a prepaid device system fraud case. The sample display screen may include a display of case information, rules triggered, negative file history and case history and notes. The case information field may be used to show for example, the device program, device number, device status, case number, and case status. The rules triggered field may be used to show for example, the rule triggered, the date and time that the rule was triggered and the triggering event. For example, as shown the address velocity rule was triggered at 18:00:21 on Nov. 1, 2004 because the threshold of 5 devices within 2 days was exceeded.

In one embodiment, a negative file database may be created for use by Issuers in an attempt to eliminate recurring use of fraudulent data for purchase and enrollment of prepaid devices. As described earlier, the database can be dynamic in that it may be continually updated as new fraudulent data is confirmed. Further, the database may be used to screen new cases as well as open accounts.

Negative files may be unique based on the Issuer. In various embodiments, the database may be used to screen enrollment attempts, accounts in which there is a change to deviceholder/buyer demographics, as well as open cases. Elements within the fraud database may comprise funding account (PAN or account number), recipient/purchaser address, phone number, government ID, email address of buyer/device holder, etc. In one example, the data may be collected during operation of the Issuer program by the processor. Each negative file in the database may be associated with further identifying and useful information. For example, date entered into the database, total number of hits, date of last hit, user ID.

In various further embodiments, the data within the negative database may be configurable. For example, the Issuer may have access to the database to add and deactivate elements contained within the database. The Issuer may further associate notes with particular files within the database, for instance, notes regarding investigation or disposition of an element. As shown in FIG. 7, a screen may further accommodate a field showing negative file information that displays hits within the database.

FIG. 8 illustrates an example of a graphical user interface for use by the Issuer or Processor in adding elements to a negative file. As shown, the GUI comprises a number of fields in which to enter elements into the negative file database. FIG. 8 shows three separate categories for classification of negative file information, namely, element type, the element to be added, and a check box category of whether to add to negative file. For example, one element type is a phone, the number in this example is 303-422-7780 and the Issuer requests addition to the negative file by checking the check box with respect to this element. The GUI may further comprise a field to input notes to explain why the elements that are being added are associated with fraud. If customers use these elements in the future, the elements will trigger a fraud rule and may open a fraud case. The element may be added to the negative file by activating a submission button or alternatively, the submission may be cancelled by activating the cancel button.

In a further example as illustrated by FIG. 9, a negative file may be created and accessed through a GUI. In this example, the negative file information is an address, the address is further associated with additional fields related to status, number of hits, the Issuer, the element type (address), the date added, the date last hit and an identification to track addition of the element to the database. The history and notes associated with the element may also be viewed for example, the GUI supports a number of fields to access the records and sort by various aspects, such as, date and time, action taken, action taken by, and details regarding the action. In this example, on Aug. 27, 2004 at 10:22:45 the address was added to the negative file by ppc.mcooper based on confirmation that the address has been used in fraud. A GUI may further be provided to facilitate entry of data into the negative database through a series of fields and drop down boxes.

In addition to the ability to add information to the negative file database, in a further embodiment, information in the negative file database may be deactivated. The system may further accommodate annotations to the information for instance, notes explaining why the information has been deactivated. In a further embodiment, the deactivated negative file elements may be archived for future reference.

Funding

The fraud rules are key indicators of potentially fraudulent enrollment attempts. However, a single violation of a parameter or threshold does not necessarily signal a fraudulent account. In one embodiment, a scoring model may be introduced to provide the Issuer with a method to detect, identify and take action on potentially fraudulent transactions. The fraud score may take into consideration from one to all events that occur during the entire life cycle of the prepaid device from enrollment, account maintenance, transactional use and customer service requests. Based on a number of events, a score may be produced and in combination with an Issuer defined threshold, an account may be identified as potentially fraudulent and the issuer alerted.

Once an enrollment request has completed the enrollment scoring, the funding account may be evaluated and verified. During the enrollment process, the device holder may be directed to select a funding account and to provide the Issuer with verification that the funding account is valid by providing for example, AVS and CVV2 validation for credit/debit cards, or a valid routing and transit number from a bank. Some examples of valid funding accounts include: credit card, debit card, bypass credit/debit card, bypass DDA loading, bypass savings account and ACH. It will be recognized that there are numerous ways to fund a prepaid account and the examples herein are not meant to be limiting.

Figure 10:
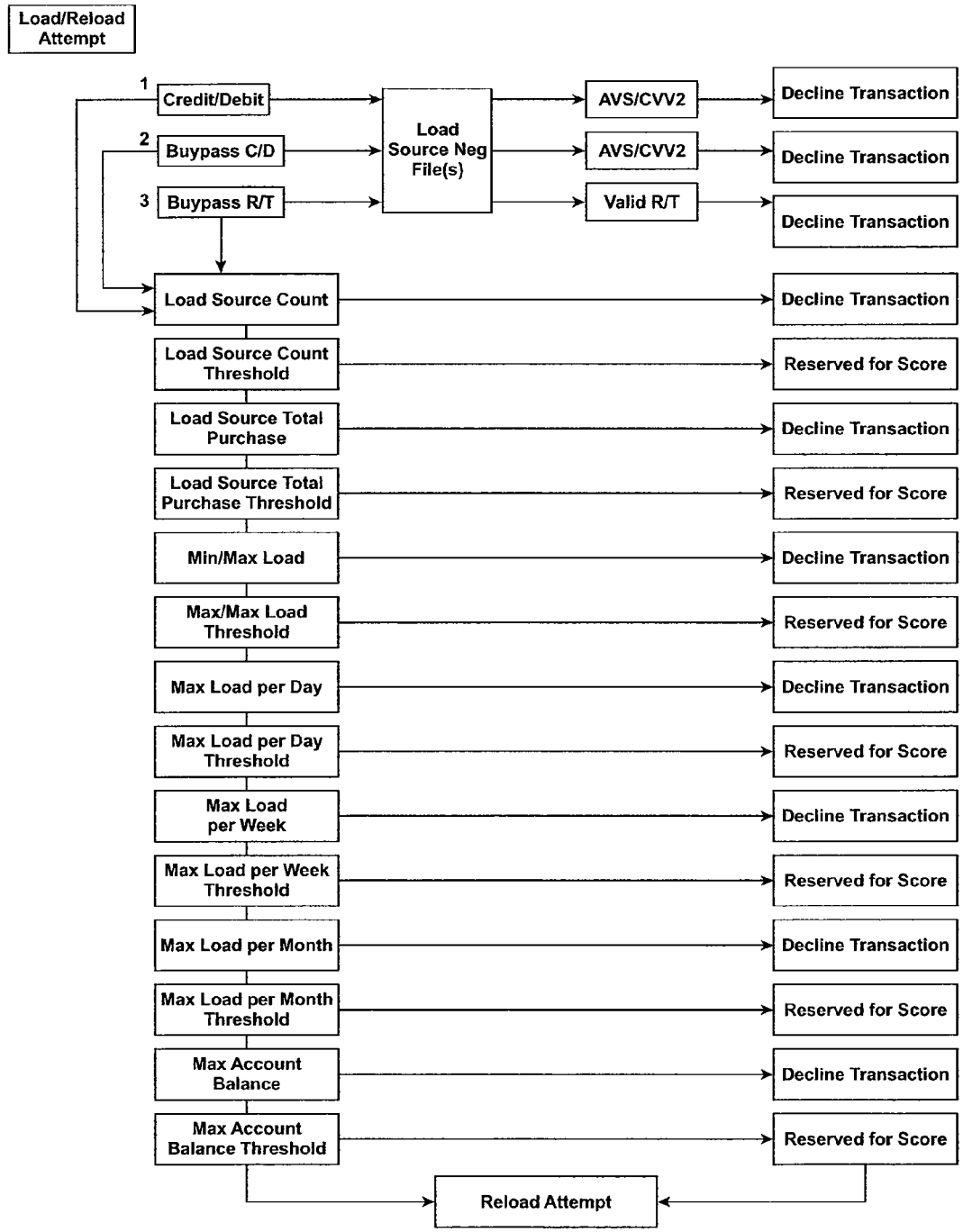
FIG. 10 illustrates an example of logical operations for processing rules relating to account reloading or funding in accordance with one embodiment of the invention.

In a further embodiment, as illustrated in FIG. 10, the Issuer and/or processor can configure rules relating to prepaid account reloading. For each reload, the Issuer can optionally define a limit and a threshold for a number of platform parameters. For example, funding account count, funding account count threshold, minimum dollar load, maximum dollar load per transaction, dollar load per transaction threshold, dollar load per transaction threshold, maximum dollar load per day, dollar load per day threshold, maximum dollar load per multiple days, dollar load per multiple days threshold, dollar load per multiple days threshold, maximum account balance, account balance threshold, credit/debit/pan-less card declines, credit/debit/pan-less declines threshold.

In one example, the rule may be configured that any transaction attempt that surpasses a limit, the transaction is declined and the purchaser prompted to revise their input. If the limit is violated during an automatic reload transaction, then the reload may be disallowed and the transaction declined. Alternatively, the device may be allowed for transaction attempts that surpass a threshold.

Device Usage

Figure 11:
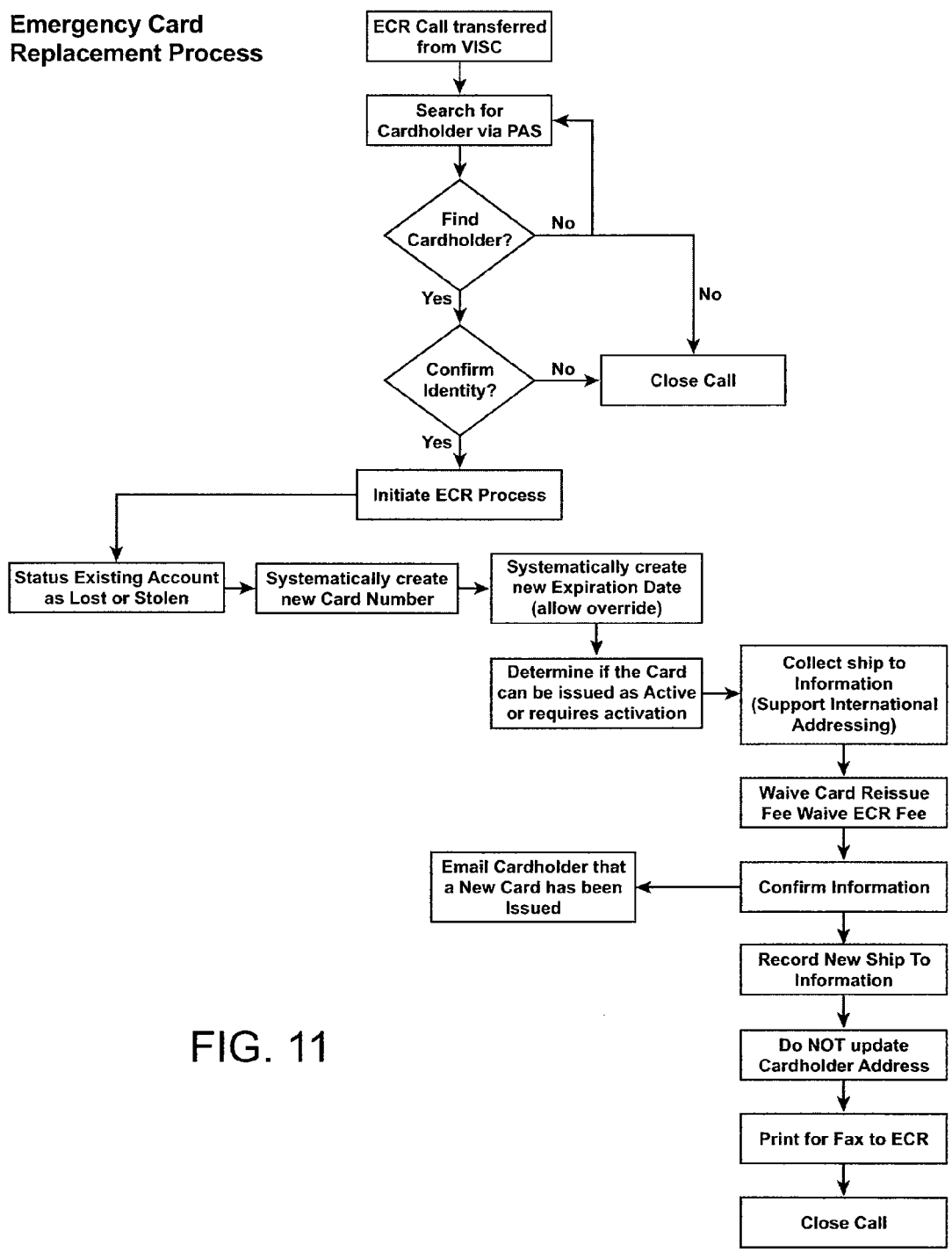
FIG. 11 illustrates an example of logical operations for managing emergency device replacement within a fraud system in accordance with one embodiment of the invention.

In a further embodiment, issued, loaded and/or reloaded devices can be monitored to identify accounts with suspect transactions. According to various embodiments, controls may be implemented to protect against fraudulent use. In one embodiment, the processor may provide a lost stolen processing/emergency device replacement. FIG. 11 illustrates an example of operations which may be performed for emergency device replacement.

As shown in FIG. 11, emergency device replacement or ECR is a fraud tracking tool. In a first operation, a device holder calls in to the processor to report a device lost or stolen. In a second operation, the system accesses the database to find and verify the device holder data. Once the device holder is verified, the system statuses the existing account as lost or stolen and systematically creates a new device number and expiration date. Based on predefined Issuer parameters, the system further may determine whether the device can be issued as active or will require activation. The system further supports ship to information related to the device, including international shipping or shipment to a hotel address. The system may collect, in reference to the device holder, name, location, address, city, state, postal code, country code, temporary phone number, ship confirm email, departure date, and itinerary. The system may be configured to apply device holder fees or enable waiving of the fee. The device holder information may be updated and an email sent to the device holder alerting them that a new device has been issued. The system may then provide the information to the vendor for fulfillment.

In a further embodiment, the device data may be run against the fraud parameters and issuance of the device may be withheld if a lost/stolen threshold parameter has been violated.

In another embodiment, an on-demand report provides the Issuer with information on under floor limit transactions. The report may contain, for example, account number, transaction amount, date and time, merchant name, ID and location. The report may further be web accessible. The database may further comprise a country code and associated floor limit for each country.

Fraud Queue

Once a rule is triggered and a fraud case created, the case is handled in the fraud queue. In one embodiment, the fraud queue may be web based to support maintenance of suspect prepaid accounts. For example, the fraud queue may be accessed via a prepaid access system to facilitate navigation through a series of web pages.

The fraud queue may be configured to support different types of fraud cases. For example, device holder and buyer cases created as a result of one of the rules being triggered subsequent to an order. In another example, a case is created at the time of an order and will include a buyer and a list of device holders.

In another embodiment, the work queue may be divided into working areas. For example, in one area, the Issuer may assign users and give authority to view and edit fraud cases. A user can transfer fraud cases to another authorized user. Cases can be searched based on any number of parameters including for example, device status, case number, case type (e.g., all, order, buyer, device holder), rule triggered, from/to search dates, device number, telephone number, sort criteria. The results of the case search may further be sorted based on any number of parameters, for example, device program, case number, case status, rules triggered and rules open, date and time the case was opened, number of devices within the case and assigned to data.

In one embodiment, a single master case is opened and all of the cases or violations for the same buyer/device holder linked to the main case. In addition, accounts that have been queued and resolved should not appear in the queue again until another rule has been violated.

An order may include multiple devices. In one embodiment, if one device or buyer in the order triggers a rule, then the entire order may be placed on hold and a master case created. Within each case, each device may further comprise a record that can be independently worked by a fraud analyst. Within each record, the analyst can clear each rule or close the record for fraud. In one embodiment, all of the device holder and buyer records may be closed for fraud or closed for no fraud to close the case. In a multiple device order where some of the devices are closed for fraud, then a partial return is required to refund the load amount and any associated fees for the fraudulent devices. For cases closed for no fraud, the embossing record is sent to the vendor to print the device such as a card.

Upon accessing a master fraud case, the analyst may view information associated with the device file. For example, the analyst may view, order information, device program, case number, case status, case type, parent case, sub-cases, devices in case, order confirmation number, order date for devices, assigned to, reassign to data, case number. In addition, buyer information such as, buyer name, rules triggered, rules open, whether the buyer is blocked. Other information related to device accounts may also be viewed such as device holder name, rules triggered, rules open, device status and case history. In one example, related cases may be accessed via a hyperlink of the buyer or device holder name. A fraud analyst may access and resolve each open rule in a case.

Once a fraud analyst accesses a buyer or device holder record, various actions are available to the analyst in resolving a fraud case. For example, the analyst may view the associated information including the rules triggered. The case may further provide information related to information obtained from third party sources.

The fraud analyst may attempt to contact the device holder/buyer to verify the enrollment or purchase attempt. For example, some options that may be supported are device holder contacted, left message, bad home phone, bad work phone, send email requesting buyer or device holder to contact Issuer to resolve. The analyst may further block an account. Blocking an account prohibits the device holder from loading value, using the device at the POS or ATM, or accessing the device holder web site functions including profile change, add funds, change PIN, change User ID and Password, close account, request a refund. The device holder can log-onto the web site and see their balance and the fact that the device is in a fraud lock status and in one embodiment may view the status of previous transactions.

The system may further provide for case resolution. In one embodiment, to resolve the case the fraud rules that are not going to be tracked for case disposition may be cleared in the related records for device holder and buyers. For the instance that no fraud is found, the analyst may remove the hold or fraud block from the account and return the account to the previous device status. If the device status was hold, then the hold is released and the embossing record is sent to the device fulfillment vendor and the status is updated to device issued. For the instance of confirmed fraud, one of the rules cannot be cleared and the device is closed for fraud.

The fraud analyst may further search for related accounts. For example, the analyst may search for accounts with the following information, all devices from buyer alias, devices with buyer address, devices with buyer phone, buyer with buyer (1) address, buyer with buyer (1) phone. If related devices are found then a case can be manually created by the fraud analyst. Upon opening an account the case may be auto-assigned to the fraud analyst.

Within the fraud queue, the Issuer or processor may access, view and download web based reports in support of fraud and risk management. For example, the Issuer may view a report that details the number of devices reported lost/stolen for a given time period, transactions that were posted without corresponding settlement, transactions posted to accounts with a status other than active, or create on-demand reports for specific information. For instance, a report detailing the number of cases created per unit time (per day, month, etc.), how many cases were resolved per unit time, how many under the floor transactions occurred by country, by merchant type, etc, or the number of thresholds hit.

In various embodiments, the fraud platform may be configured to provide compliance reporting. For example, with the USA Patriot Act Anti Money Laundering and Terrorist Financing. In particular, the system may be configured to monitor large dollar transactions, account manipulation and consolidation, transactions occurring in countries that are known sources of narcotics, transactions occurring in countries uncooperative or ineffective in controlling money laundering, and transactions occurring in countries known to harbor terrorist organizations.

For example, in one embodiment, a threshold may be set to detect large dollar transactions. In another example, an address or name change within a preset number of days of enrollment may be used as a trigger for possible account manipulation. In another example, a case may trigger for transactions occurring in countries that are known sources of Narcotics, Uncooperative or ineffective in controlling money laundering and/or known to harbor terrorist organizations. Compliance settings may be configurable by the Issuer and reports may be optional based on device program and type.

Embodiments of the invention can be implemented via appropriate software or computer program code instructions in combination with appropriate instruction execution platforms, processor(s), hardware or the like. These instructions may be in the form of a computer program product that can cause a CPU to control operation of a processing engine according to an embodiment of the invention. The combination of hardware and software to perform the functions described can form the means to carry out the processes and/or subprocesses of embodiments of the invention. In this regard, each block in the flowcharts or block diagrams may represent a module, segment, action, or portion of code, which comprises one or more executable instructions or actions for implementing the specified logical function(s). Furthermore, an embodiment of the invention may take the form of a hardware embodiment, a software embodiment (including firmware, resident software, micro-code, etc.) or an embodiment combining software and hardware aspects.

Any suitable computer usable or computer readable medium may be used, taking into account that computer program code to operate a processing engine according to embodiments of the invention may reside at various places during assembly. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out embodiments of the present invention may be written in an object oriented, scripted or unscripted programming language such as but not limited to Java, Perl, Smalltalk, C++ or the like. However, the computer program code for carrying out embodiments of the present invention may also be written in conventional procedural programming languages, such as the "C" programming language or similar programming languages. It should also be noted that functions and combination of functions described herein can be implemented by special purpose hardware-based systems or operators which perform the specified functions or acts. Any of the functions described in this application may be embodied as computer readable code on a computer readable medium.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

What is claimed is:

1. Method of monitoring fraud associated with prepaid devices, comprising:
   configuring fraud platform parameters, the parameters further comprising:
   one or more prepaid device limits defined by one or more values, each limit associated with a particular platform parameter;
   one or more prepaid device thresholds defined by one or more values, each threshold associated with a particular platform parameter, wherein the one or more prepaid device limits are associated with the one or more prepaid device thresholds and wherein the one or more prepaid device threshold is set below the associated one or more prepaid device limit;
   one or more rules that define restrictions for certain prepaid device activities;
   applying the fraud platform parameters to prepaid device production data wherein the prepaid device production data comprises prepaid device holder information and prepaid device buyer information; and
   determining whether to issue the prepaid device depending on whether any parameters were triggered by the prepaid device production data;
   validating the prepaid device production data against an internal database or an external database; and
   confirming cases of fraud associated with prepaid devices based on triggered parameters and validated prepaid device production data.

2. The method of claim 1, wherein the one or more values associated with the one or more limits are configurable.

3. The method of claim 1, wherein the one or more values associated with the one or more thresholds are configurable.

4. The method of claim 1, wherein the one or more rules are configurable by activating or deactivating within the fraud platform.

5. The method of claim 1, wherein the prepaid device production data further comprises prepaid device loading information or prepaid device transactional information.

6. The method of claim 1, wherein the confirmed fraud cases are added to a database of confirmed fraud cases.

7. The method of claim 1 wherein the prepaid device is a cellular phone, personal digital assistant, pager, or card.

8. The method of claim 1 further comprising determining whether a fraud case file should be created if any parameters were triggered by the production data.

9. The method of claim 8 further comprising compiling a report listing the number of fraud cases opened and a disposition of each case.

10. The method of claim 1 wherein the external database is an Office of Foreign Asset Control (OFAC) compliance information database, a credit reporting and scoring database, a social security number database, or a Patriot Act compliance database.

11. The method of claim 1 wherein the internal database is a negative file database.

12. The method of claim 1 wherein the one or more limits and the one or more thresholds are set up by an issuer.

13. The method of claim 1 wherein the one or more prepaid device limits and the one or more prepaid device thresholds are based on a rolling period of time defined as a number of days.

14. The method of claim 1 wherein the one or more prepaid device limits include limits placed on enrollment of the prepaid device, limits place on the prepaid device recipient address, or limits placed on the prepaid device recipient telephone number.

15. The method of claim 1 wherein the one or more prepaid device limits include limits placed on the initial purchase and value load of the prepaid device, limits on the number of prepaid devices in an single funding account, limits on the number of prepaid devices in a single funding account within a number of days, limit on the dollar balance per prepaid device per purchase, re-load limits, limits on maximum contribution, or limits on maximum re-load count.

16. Method of managing fraud associated with prepaid devices, comprising:
    entering enrollment and funding information associated with a prepaid device into a prepaid device processing system;
    uploading a platform of fraud parameters, the parameters further comprising limits, thresholds and rules designed to trigger potential prepaid device fraud cases into the processing system;
    running the enrollment and transactional information associated with the prepaid device against the fraud rules;
    verifying any information associated with the prepaid device that triggered one or more fraud rules;
    using configured rules to determine whether a fraud case is created for the prepaid device; and
    managing the fraud case in a fraud queue through disposition.

17. The method of claim 16, wherein a graphical user interface is provided to facilitate the steps associated with managing fraud associated with the prepaid device.

18. The method of claim 16, wherein the limits and thresholds each comprise at least one value.

19. The method of claim 18, wherein the at least one value is configurable.

20. The method of claim 16, wherein the rules are configurable by activating or deactivating within the fraud parameter platform.

21. The method of claim 16, wherein verifying information comprises validating against a third party database.

22. The method of claim 16, wherein verifying information comprises validating the information against a database of confirmed fraud cases.

23. The method of claim 16, wherein determining whether a fraud case is created comprises applying a scoring model comprising a method to detect, identify and take action on any information that triggered one or more fraud rules.

24. A method of managing fraud associated with prepaid devices, comprising:
    identifying a potential fraud case based on information associated with a prepaid device, wherein the potential fraud case is triggered by application of a set of fraud parameter rules to enrollment and funding information associated with the prepaid device;
    verifying the information associated with the prepaid device against one or more databases to confirm whether the information associated with the prepaid device is fraudulent; and
    updating a database of confirmed fraudulent information by adding the confirmed fraudulent information associated with the prepaid device to the database.

25. The method of claim 24, wherein the information associated with the prepaid device is enrollment information or load information.

26. The method of claim 24, further comprising running one or more preexisting prepaid devices against the updated database.

27. The method of claim 24, further comprising managing the fraud case in a fraud queue.

28. The method of claim 24 wherein each fraud parameter rule in the set of fraud parameter rules comprises one or more triggers that can be activated or deactivated.

* * * * *